Dec. 3, 1968   J. R. BENNETT   3,413,932
BULKHEAD
Filed Oct. 3, 1966   2 Sheets-Sheet 1
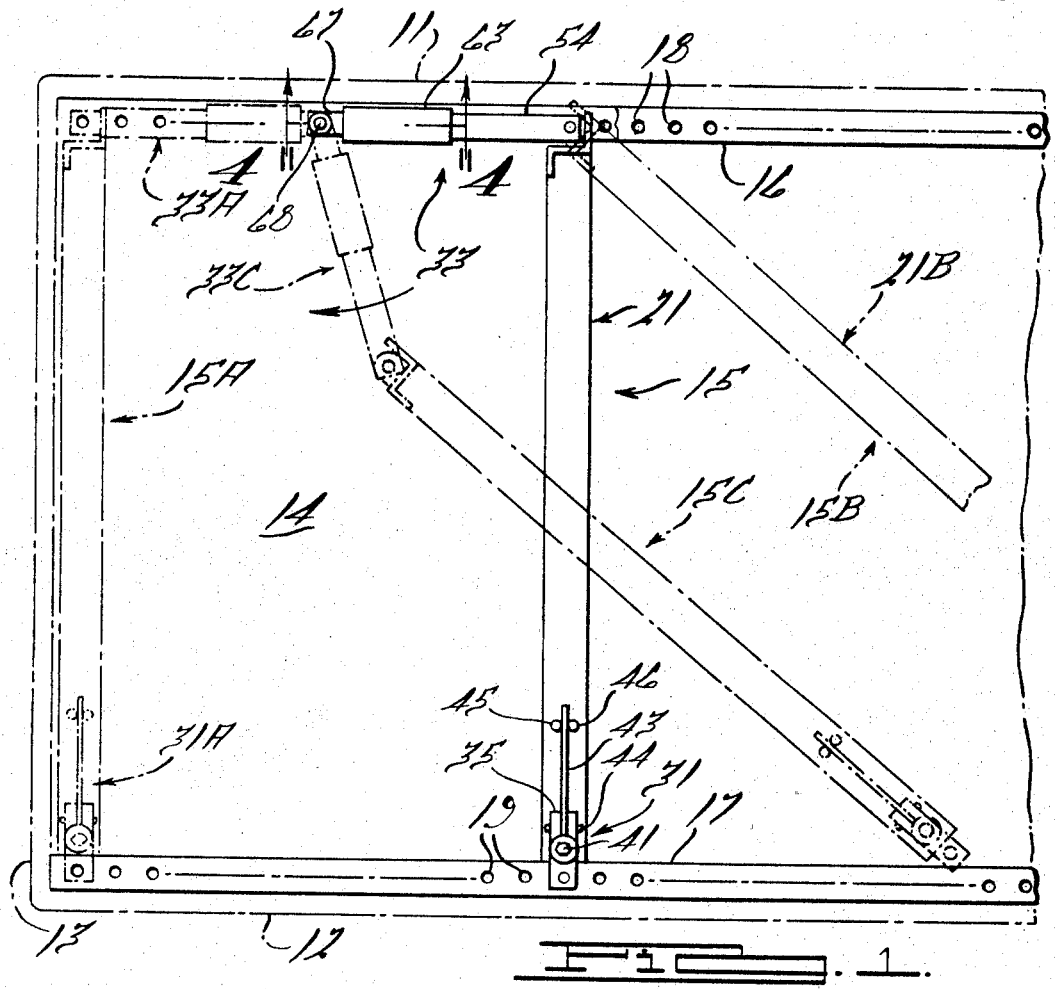
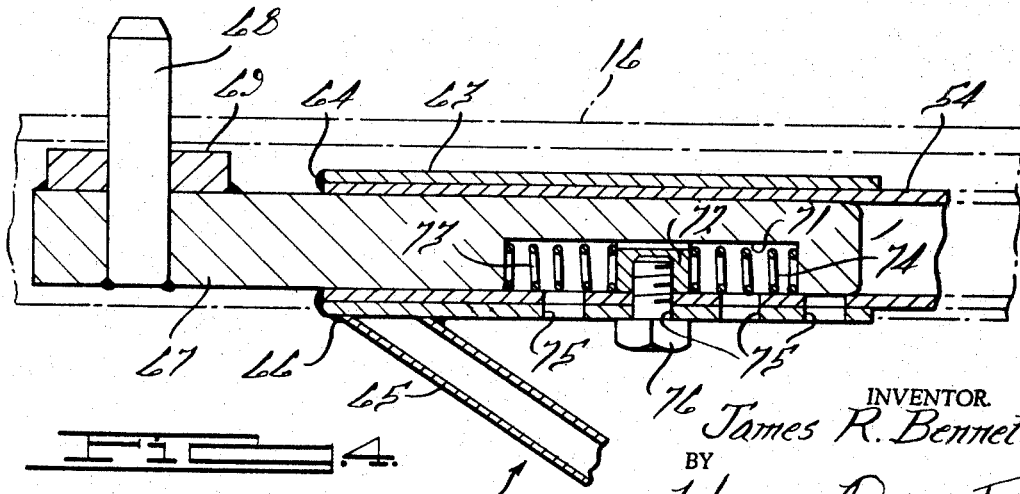
INVENTOR.
James R. Bennett
BY
Harness, Dickey & Pierce
ATTORNEYS

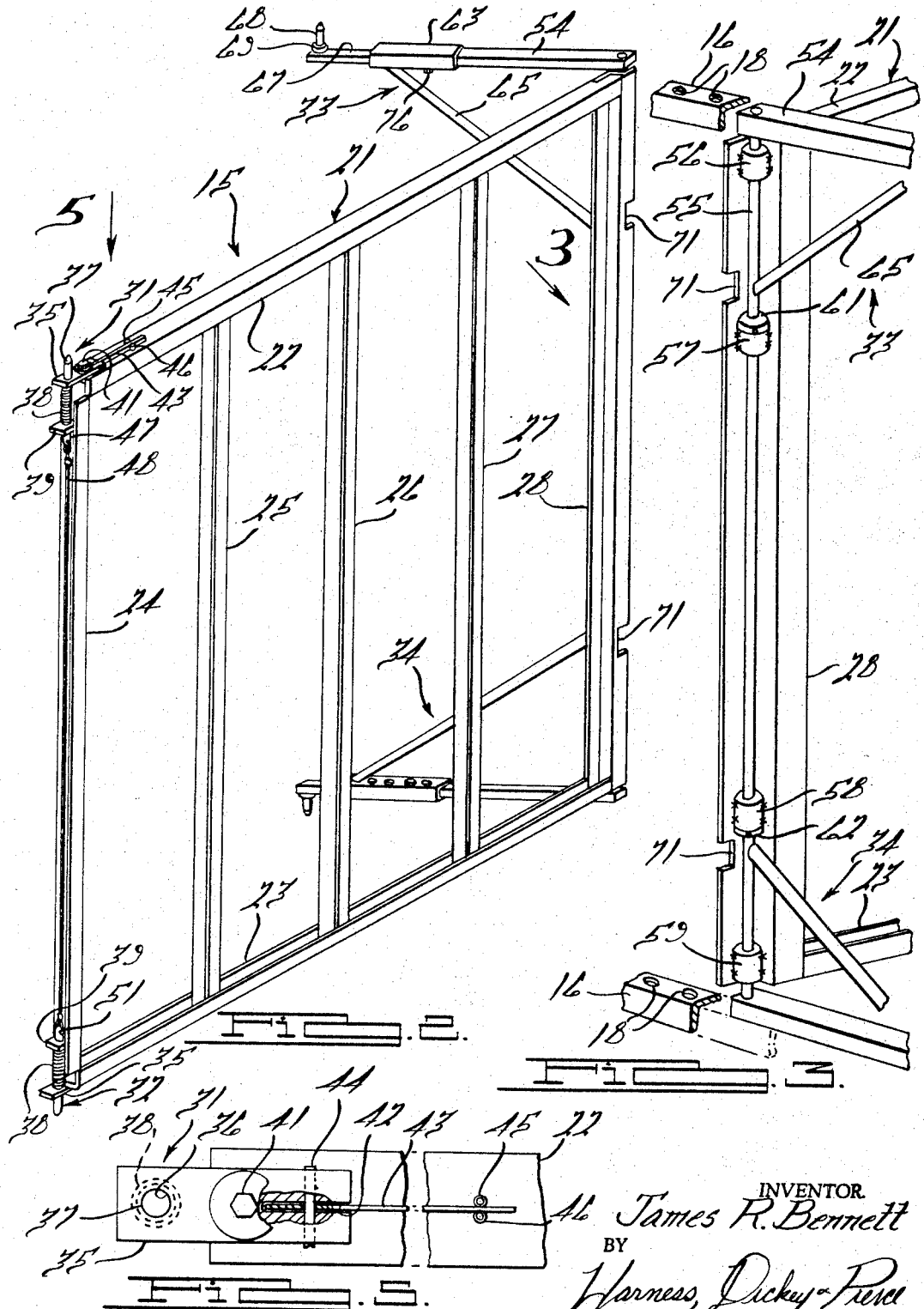

United States Patent Office 3,413,932
Patented Dec. 3, 1968

3,413,932
BULKHEAD
James R. Bennett, New Boston, Mich., assignor to Evans Products Company, a corporation of Delaware
Filed Oct. 3, 1966, Ser. No. 583,528
6 Claims. (Cl. 105—376)

ABSTRACT OF THE DISCLOSURE

A cargo bracing system including a freight bracing bulkhead assembly carrying locking pins at one of its sides for coaction with pin plates at one side of a cargo area for locking the one side of the bulkhead in a bracing position. Arms are pivotally connected to the other side of the bulkhead at one of their ends and carry locking pins at their opposite ends for effecting a detachable connection to pin plates carried at the opposite side of the cargo area.

---

This invention relates to a freight bracing device and more particularly to an improved freight bracing device of the bulkhead type.

The most conventional type of freight bracing bulkhead assembly is supported upon tracks for movement along the length of a cargo area particularly that of a freight transporting vehicle such as a railway car to selected freight bracing positions. A locking mechanism is provided for retaining the bulkhead assembly in its selected bracing position. This type of bulkhead assembly offers a high degree of versatility in that the bulkhead may be positioned in any of a plurality of freight bracing positions. The supporting mechanism and locking mechanism for such bulkhead assemblies, however, become quite complicated and add considerable cost to the assembly. In many instances, this versatility is unnecessary since the same size loads may be repeatedly transported in a given vehicle. The bulkhead, nevertheless, should be storable when not being used.

It is, therefore, a principal object of this invention to provide an improved, simplified bulkhead assembly.

It is a further object of this invention to provide a bulkhead assembly that may be conveniently moved from a freight bracing position to a storage position.

It is another object of this invention to provide a freight bracing bulkhead assembly that in use is normally positioned in a fixed position but is adjustable within a range from this fixed position.

It is a further object of this invention to provide a bulkhead assembly that is yieldable or cushioned with respect to its locking mechanism to reduce the possibility of damage to the locking mechanism under shock loadings.

A freight bracing bulkhead assembly embodying this invention is particularly adapted for use for bracing freight within a cargo area having transversely spaced, longitudinally extending attachment means. The bulkhead assembly comprises a bulkhead frame having means for engaging freight within the cargo area. First locking means are carried at one side of the bulkhead frame for effecting a detachable connection to at least one of the longitudinally extending attachment means. The first locking means coacts with the one longitudinally extending attachment means for retaining the one side of the frame relative to the cargo area. Supporting arm means are pivotally connected at one end to the other side of the bulkhead frame for pivotally mounting the supporting arm means relative to the bulkhead frame. Second locking means carried at the other end of the supporting arm means effect a connection to the other of the longitudinally extending attachment means for fixing the other side of the bulkhead frame relative to the cargo area.

A further feature of a bulkhead assembly embodying this invention is the provision of yieldable means for cushioning relative movement between the freight bracing bulkhead frame and locking means carried at opposite sides of the frame. The yieldable means permits limited transverse relative movement between the locking means and the bulkhead frame for cushioning shock loadings upon the frame without transmitting them to the locking means.

Other objects and advantages of this invention will become more apparent as this description proceeds, particularly when considered in conjunction with the accompanying drawings, wherein:

FIGURE 1 is at op plan view of a cargo area and cooperating freight bracing bulkhead ashsembly embodying this invention and showing the bulkhead assembly in several positions.

FIGURE 2 is a perspective view of the bulkhead assembly shown in FIGURE 1.

FIGURE 3 is a perspective view taken in the direction of the arrow 3 shown in FIGURE 2.

FIGURE 4 is an enlarged cross-sectional view taken along the line 4—4 of FIGURE 1.

FIGURE 5 is an enlarged view taken in the direction of the arrow 5 in FIGURE 2.

Referring now in detail to the drawings and in particular to FIGURE 1, a portion of a railway car, other freight transporting vehicle or other type of cargo area is shown in phantom and is comprised of generally vertically extending side walls 11 and 12 interconnected at one end by an end wall 13 to define, in part, a cargo area 14. A freight bracing bulkhead assembly embodying this inevntion is identified generally by the reference numeral 15 and is shown in solid lines in a freight bracing position and in dot-dash lines in other positions as will become more apparent as this description proceeds.

Upper and lower pin plates 16 and 17 are provided at each side of the cargo area 14 adjacent the side walls 11 and 12, respectively. The pin plates 16 and 17 are provided with a plurality of longitudinally spaced apertures 18 and 19, respectively, that provide a means for attachment of the bulkhead assembly 15 for restraining the bulkhead assembly 15 in its desired positions.

Referring now in detail to FIGURE 2, the bulkhead assembly 15 is comprised of a freight engaging frame, indicated generally by the reference numeral 21, made up of facing upper and lower horizontally extending channel members 22 and 23, respectively. A plurality of vertically extending Z-shaped structural members 24, 25, 26, 27 and 28 are affixed to the channel shaped members 22 and 23 to complete the frame 21. If desired a sheet metal facing or the like (not shown) may be positioned across the otherwise open face of the frame 21. In many instances, however, it is unnecessary to provide this facing and either type of frame assembly is embraced within the scope of this invention.

Upper and lower locking pin assemblies 31 and 32 are provided at the left hand side of the frame assembly 21, as viewed in FIGURE 2, adjacent the structural member 24, for coaction with the pin plates 17 to detachably connect this side of the bulkhead assembly 15 with respect to the cargo area 14. Upper and lower supporting arm assemblies 33 and 34 are provided at the opposite side of the bulkhead frame 21 for providing a detachable connection of this side to the cargo area 14 and particularly to the pin plates 16. In addition, yieldable cushioning means are provided between the bulkhead frame 21 and the means of attachment provided by the locking pin means 31, 32 and supporting arm assemblies 33 and 34 for permitting some relative movement of the bulkhead assembly 15 within the cargo area 14. This cushioned relative movement relieves the locking means from the shock loading transmitted to the frame 21 by the load that it braces. The cushioning mechanisms will be described in more detail as this description proceeds.

The locking pin means 31 and 32 are substantially the same in construction with the exception that they are inverted one with respect to the other. For this reason, only the upper locking pin means 33 will be described in detail by particular reference to FIGURES 2 and 5. The upper locking pin means 31 comprises a supporting plate 35 that has an end that projects outwardly beyond the frame side member 24 and in which a cylindrical bearing 36 is provided. A locking pin 37 is supported for reciprocation within the bearing 36 for movement into and out of selected ones of the apertures 19 in the upper pin plate 17. A collar (not shown) is affixed to the pin 37 on the underside of the plate 35 and is engaged at its lower end by a coil spring 38 that reacts against a fixed abutment plate 39 to normally urge the locking pin 37 to its engaged or extended position.

The plate 35 is supported upon the bulkhead frame channel member 22 by means of a bolt 41 that passes through an aperture in the plate 35. The plate 35 is thus permitted to rotate about the longitudinal axis of the bolt 41 but is otherwise prevented from axial movement. An elongated slot 42 is formed on the inner end of the plate 35, and one end of a leaf spring 43 extends into the slot 42. This spring end is fixed relative to the plate 35 within the slot 42 by means of a pin 44. The opposite end of the leaf spring 43 is engaged by a pair of rollers 45 and 46 that are fixed to frame member 22. It should be readily apparent that the locking pin 35 may rotate with its respective supporting end of the plate 35 relative to the axis defined by the bolt 41 under the application of force loads to the frame 21. The leaf spring 43 will resist this relative rotation but will permit the frame 21 to be displaced slightly relative to the pins 37. The spring 43 will move the frame 21 to its normal position, as shown in FIGURE 5, when any force loading is removed.

The lower end of the locking pin 37 is formed with a boss 47 to which a flexible cable 48 is fixed. The lower end of the flexible cable 48 is connected to a locking pin 51 of the lower locking pin assembly 32. The remainder of the locking pin assembly 32 is substantially the same as that described for the locking pin assembly 31 and also employs a cushioning mechanism whereby it may pivot with respect to the bulkhead frame 21.

When the locking pin assemblies 31 and 32 are to be released, the flexible cable 48 is grasped by an operator and pulled outwardly with respect to either side of the bulkhead frame 21. This action will draw the locking pins 37 and 51 inwardly against the action of the coil springs 38 sufficiently to clear the apertures 19 and the pin plate 17. This side of the bulkhead assembly 15 will then be free to move.

The supporting arm assemblies 33 and 34 are substantially the same but are inverted with respect to one another. Thus, only the upper supporting arm assembly 33 will be described by particular reference to FIGURES 2, 3 and 4. The supporting arm assembly 33 is comprised of a horizontally extending generally tubular arm member 54 that is fixed at one end to the upper end of an elongated rod 55 that is journaled upon the bulkhead frame member 28 by means of axially spaced bearings 56, 57, 58 and 59. Collars 61 and 62 are fixed to the rod 55 and engage the upper and lower sides, respectively, of the bearing members 57 and 58 to preclude axial shifting of the rod 55 with respect to the bulkhead frame assembly 21.

The inner end of the arm member 54 is received in a complementary opening of a tubular member 63 and is affixed thereto, as by a weld 64. A tubular diagonal member 65 is fixed at one of its ends, as by weld 66, to the member 63 and is fixed as by a weld at its opposite end to the rod 55.

Telescopically received within the central opening of the tubular arm member 54 is a second generally rectangular arm member 67 that carries a locking pin 68 at its outer end. A washer or bearing member 69 is positioned around the locking pin 68 and is fixed to the upper side of the arm member 67 to preclude damage to the arm members 63 and 54.

The inner end of the arm member 67 is formed with a generally rectangular recess 71 in its lower face in which a nut 72 is supported between a pair of coil springs 73 and 74. A plurality of longitudinally spaced apertures 75 are formed in the underside of the arm members 63 and 54 through which a bolt 76 may be passed and threaded into the nut 72. The spacing between the apertures 75 is preferably equal to the spacing between the apertures 18 and 19 in the pin plates 16 and 17, respectively. The bolt 76, nut 72 and springs 73 and 74 resiliently connect the arm members 67 and 54 together for limited relative axial movement.

The locking pin 68 of each of the arm assemblies 33 and 34 may be received in a selected pair of apertures 18 in the pin plates 16 for affixing this side of the bulkhead assembly 15 relative to the cargo area 14. The locking pins 68 may be fixed within the aperture 16, that is, this end of the arm assemblies 33 and 34 may be permanently attached for pivotal movement to the pin plates 16 or, alternatively, some form of release mechanism (not shown) may be provided so that the attachment of the arm assemblies 33 and 34 to the pin plates 16 may be adjusted.

The bulkhead assembly 15 is particularly adapted for use in transporting articles within a railway car, which car normally carries the same size articles in successive trips. Thus, the bulkhead frame 21 is normally positioned in the same location when a load is being transported, which position is shown in the solid line view in FIGURE 1. The bulkhead assembly 15 also may be stored against the end wall 13, as shown in the dot-dash line position wherein the suffix A has been added to the reference numerals when the transporting vehicle is being returned empty or is carrying other types of loads. The movement between the positions 15 and 15A may be accomplished without disconnecting the attachment provided for by the arm assemblies 33 and 34 with the pin plates 16. This operation will now be described.

Assuming that the bulkhead assembly 15 is in its cargo bracing position as shown in the solid line of the figures and it is desired to unload the car, the locking pin assemblies 31 and 32 are released in the manner previously described by pulling upon the flexible cable 48. The bulkhead frame 21 may then be pivoted in a clockwise direction as viewed in FIGURE 1 about the vertical axis provided for by the rod 55. The arm assemblies 33 and 34 will then remain in the solid line position adjacent and parallel to the side wall 11 and the frame assembly 21 can be pivoted to the dot-dash position identified by the reference numerals bearing the suffix B. This permits access to the portion of the cargo area 14 previously blocked off by the bulkhead frame 21 so that the load may be removed. Cutouts 71 are formed in the frame side member 28 to provide clearance for the arm member 65 during this movement.

When returning the transporting vehicle to its destination for another load, the arm assemblies 33 and 34 are pivoted in a clockwise direction, retaining the frame assembly 21 in the displaced position previously described, about their pivotal connection to the locking pin plate 16 provided for by the locking pin 68. An intermediate position assumed by the arm assemblies 33 and 34 and bulkhead frame 21 is shown in the dot-dash view identified by the reference numerals bearing the suffix C. This movement is continued until the bulkhead frame 15 is positioned adjacent the end wall 13 as shown in the dot-dash view where the reference numerals bear the suffix A. Preferably, in this position, the arm assemblies extend parallel to the side wall 11. The lock pin assemblies 31 and 32 are used to retain the respective side of the bulkhead assembly 15 in this position.

If adjustment is desired for the bracing position of the bulkhead frame 21, the arm member 67 of each of the arm assemblies 33 and 34 may be telescoped in the respective direction within the arm member 54 by disconnecting the bolt 76 from the nut 72 and aligning the nut 72 with the desired aperture 75. The bolt 76 is then reinserted to lock the arm assembly in its newly adjusted length.

It is well known in this form of freight handling that the bracing device is subjected to high shock loads. These loads can frequently damage the locking pins and preclude their disengagement from the pin plates. A shock absorbing mechanism has been provided, however, between the frame assembly 21 and locking pin assemblies 31 and 32 and the locking pins 68 of the arm assemblies 33 and 34. Considering first the cushioning mechanism at the left hand side of the bulkhead frame as viewed in FIGURE 2, it has previously been noted that the locking pins 37 and 51 are pivotally supported with respect to the bulkhead frame 21 by the plates 35. The leaf springs 43 yieldably resist this movement and provide cushioning at this side of the bulkhead frame. At the opposite side of the bulkhead frame, shock loadings tend to cause the arm members 54 and 67 to telescope with respect to each other, which telescoping movement is resisted by the coil springs 73 and 74. Thus, these springs cushion shock loading at this side of the bulkhead assembly and tend to return the bulkhead frame 21 to its normal position.

I claim:

1. A bulkhead assembly for bracing freight within a cargo area having transversely spaced pairs of upper and lower longitudinally extending attachment means, said bulkhead assembly comprising a bulkhead frame having means for engaging freight within the cargo area, a first pair of locking means carried at the upper and lower ends of one side of said bulkhead frame for effecting a detachable connection to at least one of the upper and lower longitudinally extending attachment means, said first locking means coacting with the one upper and lower longitudinally extending attachment means for restraining said one side of said frame relative to the cargo area, a pair of supporting arm means, means pivotally connecting one end of each of said pair of supporting arm means to the other side of said bulkhead frame contiguous to its upper and lower ends, respectively, for pivotal movement of said supporting arm means relative to said bulkhead frame, and a second pair of locking means each carried at the other end of a respective one of said pair of supporting arm means for effecting a connection between said second locking means and the other of the upper and lower longitudinally extending attachment means.

2. A bulkhead assembly as set forth in claim 1 wherein the second pair of locking means provides a pivotal connection between the respective supporting arm means and the respective longitudinally extending attachment means for pivotal movement of said supporting arm means and the bulkhead frame carried thereby relative to the cargo area upon release of the first pair of locking means.

3. A bulkhead assembly as set forth in claim 1 wherein the first pair of locking means comprises a pair of spring biased pins urged to their engaged position and a flexible cable interconnected to each of said locking pins for selectively releasing said locking pins against said spring biased pin means.

4. A bulkhead assembly as set forth in claim 3 wherein each of the supporting arm means is telescopic for adjustment of the distance between its pivotal connection to the bulkhead frame and the respective of the second pair of locking means.

5. A bulkhead assembly as set forth in claim 4 further including biasing means for yieldably resisting relative movement between the telescopic portions of the supporting arm means and including resilient means for cushioning relative movement between the first pair of locking means and the bulkhead frame.

6. A bulkhead assembly as set forth in claim 5 wherein the first pair of locking means comprises locking pin means supported for reciprocal movement in a supporting member, means supporting the supporting member for pivotal movement upon the bulkhead frame, the yieldable biasing means comprising leaf spring means having one end thereof affixed to said supporting means and its other end fixed for reaction against said bulkhead frame.

References Cited

UNITED STATES PATENTS

| | | | |
|---|---|---|---|
| 2,911,925 | 11/1959 | Adler et al. | 105—376 |
| 3,029,747 | 4/1962 | Shaver | 105—376 |
| 3,217,664 | 11/1965 | Aquino et al. | 105—376 |

DRAYTON E. HOFFMAN, *Primary Examiner.*